FIG. I.

INVENTOR
DONALD J. HINKEIN
BY Edgar H. Kent
ATTORNEY

Dec. 24, 1963 D. J. HINKEIN 3,115,583

INFORMATION-GATED FLIP-FLOP ADAPTED TO GENERATE OUTPUT IN RESPONSE TO MILLIMICROSECOND SAMPLING PULSE FROM BLOCKING OSCILLATOR

Filed April 18, 1960

5 Sheets-Sheet 2

Dec. 24, 1963 D. J. HINKEIN 3,115,583

INFORMATION-GATED FLIP-FLOP ADAPTED TO GENERATE OUTPUT IN RESPONSE TO MILLIMICROSECOND SAMPLING PULSE FROM BLOCKING OSCILLATOR

Filed April 18, 1960 5 Sheets-Sheet 3

Dec. 24, 1963 D. J. HINKEIN 3,115,583

INFORMATION-GATED FLIP-FLOP ADAPTED TO GENERATE OUTPUT IN RESPONSE TO MILLIMICROSECOND SAMPLING PULSE FROM BLOCKING OSCILLATOR

Filed April 18, 1960

5 Sheets-Sheet 5

United States Patent Office 3,115,583
Patented Dec. 24, 1963

3,115,583

INFORMATION-GATED FLIP-FLOP ADAPTED TO GENERATE OUTPUT IN RESPONSE TO MILLIMICROSECOND SAMPLING PULSE FROM BLOCKING OSCILLATOR

Donald J. Hinkein, Germantown, N.Y., assignor to International Business Machines Corporation, New York, N.Y., a corporation of New York Filed Apr. 18, 1960, Ser. No. 23,072
13 Claims. (Cl. 307—88.5)

This invention relates to electronic digital computers and similar types of machines and more particularly to logic components suitable for incorporation in such machines.

In the logical organization of digital computers and other similar types of data processing machines a variety of logic components are utilized to channel the various data and control signals and to combine them in various logical functions. These logic components, which are, in a sense, the building blocks of which the machine is made, are combined in divers manners to perform complex logical operations, to decode information and, generally, to perform or supervise many, if not most, of the operations necessary in the digital computer. In these machines, in which increased speed and versatility are being constantly sought, the nature of such logic components determines, in large measure, the speed, the versatility, the cost and the reliability of the machine.

Accordnigly it is a principal object of this invention to provide an improved logic component suitable for utilization in digital computer and data processing machine organizations.

Another object of the invention is to provide a novel logic component capable of performing a variety of logical functions and being particularly adapted for use as read out means for sampling a data storage device.

Another object of the invention is to provide improved high speed decoder circuits utilizing such logic components.

Still another object of the invention is to provide a versatile, reliable and high speed logic component which is significantly less expensive than other comparable components capable of operating at a similar rate.

A further object of the invention is to provide an improved high speed logic component capable of being packaged more densely than comparable types of components heretofore available.

The invention provides a novel, basic computer logic component. In the hereinafter described embodiments this component includes a transistor arranged in common emitter configuration which is conditioned in its collector circuit by an information conveying conditioning level signal of variable time duration from a suitable low impedance data memory device. An input pulse signal of substantially fixed duration and of proper polarity, applied to the base electrode of the transistor when the collector is appropriately conditioned by the level signal source, turns the transistor on and permits current flow in its collector circuit. A pulse transformer, having its primary winding connected in the collector circuit, is provided so that the current flow induces an output signal in the transformer secondary indicative of the concurrent presence of the information conveying level signal and the pulse signal. The base collector circuit of the single transistor employed in the component is turned off at all times except when both the conditioning level and the input pulse signal are simultaneously present. Thus, even when the component is conditioned by the level signal there is no current drain from the source except during the short interval of input pulse duration. In this device the logic component transistor is never deep in saturation due to the short duration of the pulse, and therefore hole storage and its inherent delays are avoided. Thus the invention provides an exceptionally high speed device in comparison with comparable logic components of the prior art which included an element that continuously drew current whenever a conditioning level was present. The component is capable of being combined to perform a variety of logical functions such as AND, Exclusive OR, and decoding and enables a substantial reduction in the number of active elements required, thus enabling a significant reduction in cost. This reduction also permits a more dense packaging of logic components, a particular advantage in the not unusual case where the available space is at a premium. The component is a reliable device and has been incorporated in computer circuitries operating at pulse repetition frequencies in excess of five megapulses per second. A preferred embodiment of the component is capable of producing an accurate and uniform forty millimicrosecond output pulse with a transformer primary current of forty milliamperes. The utilized transformer has a stepdown turns ratio which results in a secondary pulse current of approximately one hundred milliamperes. Where it is desired to use all PNP or NPN transistors in both the logic component and the conditioning source the source should include an emitter follower stage. However if a combination of NPN and PNP transistors is permitted the basic logic component and the conditioning source circuitry each requires only a single transistor. As the conditioning sources have no external current drain except during the short time when the associated basic logic component is sampled a number of them may be readily paralleled to provide an OR function with the collector circuit of a single gating transistor without any adverse effect. Further, the transistor circuit of the basic logic component easily accommodates modification to provide an AND function, an OR function or a combination thereof in its base circuit. The versatility of the component is indicated by the advantages that flow from its incorporation in decoding networks of matrix and of the level ANDing type, for example. Such decoders are capable of operation at high speeds and with a large number of outputs. These decoder configurations also enable marked reductions in the numbers of transistors employed. In still other logic configurations, conditioning sources in the nature of flip-flops may condition a plurality of gate circuits or a single logic component may be utilized to control the transfer of signals from an entire flip-flop register. Thus the invention provides a compact, comparatively inexpensive, and highly reliable component circuitry adapted for organization in a variety of combinations to perform logical functions of the nature required in digital computer circuitries.

Other objects and advantages of the invention will be seen as the following description of preferred embodiments thereof progresses, in conjunction with the drawings, in which.

Figure 1:
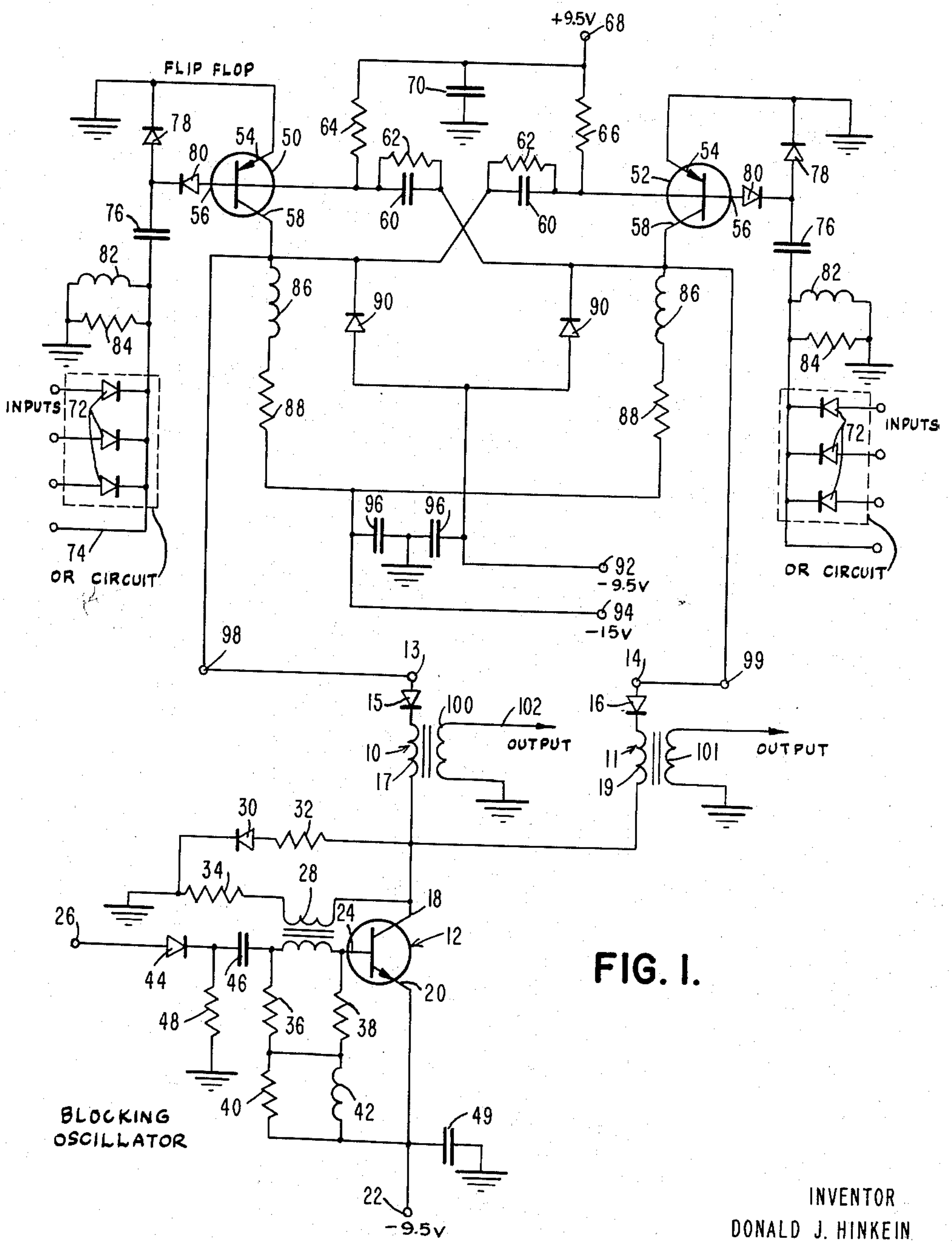
FIG. 1 is a schematic diagram of a first embodiment of a logic component circuitry illustrating principles of the invention.

There is shown in FIG. 1 an embodiment of the basic logic component of the invention together with a preferred form of a data storage device (a "D.C. level conditioning source"—the output of which is variable in time duration and has a minimum duration of at least twice that of a pulse signal). The source provides a conditioning signal indicative of the data stored therein. The logic component includes two pulse transformers 10, 11 and an NPN transistor 12. Terminals 13, 14 of the component are connected through diodes 15, 16 to the primary windings 17, 19 of the pulse transformers. The other sides of the primary windings are connected to the collector electrode 18 of the transistor. The emitter electrode 20 is connected to a −9.5 volt source at terminal 22, and the base electrode 24 is connected to an input circuit responsive to positive pulses applied at terminal 26. A blocking oscillator circuit arrangement includes the transformer 28 connected in feedback relationship from the collector electrode 18 to the base electrode 24 and provides output pulse shaping and pulse duration control. The diode 30 and resistors 32 and 34 provide damping in the blocking oscillator circuit. Additional pulse shaping is provided by the inductive resistive network which includes resistors 36, 38 and 40 and inductance 42. The positive input pulse, applied through diode 44, capacitor 46 and the winding of transformer 28 to the base electrode of the transistor obtains transistor action when a D.C. conditioning level is applied to the collector electrode.

The D.C. level conditioning source which is shown in FIG.1 is, in general, a conventional bistable multivibrator which includes two cross-coupled inverter stages, each of which includes a PNP transistor 50, 52. Each transistor has an emitter electrode 54, a base electrode 56 and a collector electrode 58. The emitters are grounded and an input signal, applied to the base electrode of an off transistor 50, turns that transistor on. When transistor 50 turns on the resultant changed output signal from its collector electrode is cross-coupled through a coupling network of capacitor 60 and resistance 62 to the base of the opposite inverter transistor 52 which was initially in conducting condition to turn that transistor off. A similar cross-coupling arrangement serves to maintain the inverter in this changed state until the application of an input signal to the base of transistor 52. Conventional base-biasing resistors 64, 66 which are connected to a +9.5 volt source at terminal 68 are provided and capacitors 70 are conventional power supply filter decoupling capacitors. The input circuit to each inverter stage includes a plurality of diodes 72 which are connected together as an OR circuit to which input pulses may be applied. An auxiliary input on line 74 is also provided for connecting additional diodes externally. A positive input pulse transition is applied to capacitor 76 but is not coupled to the base as its output side is clamped at ground by diode 78. When the pulse ends the falling voltage transition is then coupled through the capacitor and diode 80 to the base of the transistor so that the emitter base junction becomes forward biased and the transistor turns on. The inductance 82 and resistance 84 provides a high input impedance to applied pulses and supply a discharge path for capacitor 76. This input circuit arrangement insures that the flip-flop will not be in a stage of intermediate condition if pulses are applied simultaneously to sample the flip flop and to change the state of the flip-flop, and thus it provides a pulse dodging function.

The output circuit from the collector electrode of each transistor includes an inductance 86 in series with a resistance 88 which increases the impedance of the collector circuit and directs current so that excellent rise and fall time of the output signal is provided. There is also provided a clamping diode 90 connected to a −9.5 volt source at terminal 92. The inductive-resistance circuit, connected to a −15 volt source at terminal 94, is a peaking circuit which improves output signal transitions. Capacitors 96 are connected between terminals 92, 94 and ground. Output terminals 98, 99 are connected to the collector electrodes of transistors 50, 52 respectively.

The component operates as follows. Assume transistor 50 is conducting with the potential at the output terminal 98 at approximately ground so that the collector of transistor 12 is conditioned. However, as the emitter base junction of the transistor becomes forward-biased only in response to a pulse applied at terminal 26, the emitter collector circuit of transistor 12 is not conducting and draws no current from the conditioning source (transistor 50 of the flip-flop). When a pulse is applied to the base electrode 24 of the transistor 12 when its collector circuit is conditioned, the emitter base junction becomes forward-biased and the transistor conducts so that current flows through the collector circuit and an output pulse is induced in the secondary winding 100 of transformer 10 to provide a signal on line 102. Similarly an output pulse is induced in secondary 101 of transformer 11 in response to an input pulse when transistor 52 is conducting. An input pulse of approximately ten milliamperes in this embodiment produces a forty-five milliampere pulse in the collector circuit when the component is conditioned. Hole storage in the saturated flip-flop inverter transistor provides the current for the output pulse. However, if the circuit arrangement was such that transistor 12 was not always conditioned (the ONE outputs of a plurality of flip-flops being applied to the collector, for example) a slight transistor action (but no output signal) would occur when a pulse is applied to base electrode 24 due to the positive feedback action of transformer 28. As current is drawn from the conditioning source only under pulse conditions with this logic component the source does not have to be designed to handle high D.C. currents as in the heretofore utilized circuitries. However, the impedance of the source should be low (in the order of ten–twenty ohms) or voltages will be developed which might adversely affect the source, as in this example, such a voltage might switch the flip-flop to the opposite state. It will be noted that the component utilizes only one transistor which is conditioned in its collector circuit by a level applied directly to its collector circuit to provide output signals indicative of two states of the memory device, thus eliminating two conditioning transistors, a gating transistor and their associated circuitry which have been conventionally used in comparable logic components assemblies. A further advantage of this arrangement over transistor components which are conditioned in the emitter circuit is in avoiding the degeneration effects inherent in that arrangement. As substantially no impedance is placed in the emitter circuit the amplitude and rate of current build-up in the transistor action is not limited by that factor. Suitable values for the elements of this embodiment are as follows:

| | |
|---|---|
| Transistor 12 | Fairchild 2N706. |
| Transistors 52, 54 | Motorola 2N695. |
| Diodes (all) | Transitron T6G. |
| Transformers (all) | 2.3:1 turns ratio. |
| Resistors: | |
| 32 | 1200 ohms. |
| 34 | 180 ohms. |
| 36 | 820 ohms. |
| 38 | 510 ohms. |
| 40 | 1,000 ohms. |
| 62 | 2700 ohms. |
| 64 | 27,000 ohms. |
| 66 | 27,000 ohms. |
| 84 | 1,000 ohms. |
| 88 | 750 ohms. |

Capacitors:

| | |
|---|---|
| 46 | 100 μμf. |
| 49 | 0.1 μf. |
| 60 | 100 μμf. |
| 70 | 0.1 μf. |
| 76 | 100 μμf. |
| 96 | 0.1 μf. |

Inductances:

| | |
|---|---|
| 42 | 6.8 μh. |
| 82 | 4.7 μh. |
| 86 | 22 μh. |

Figure 2:
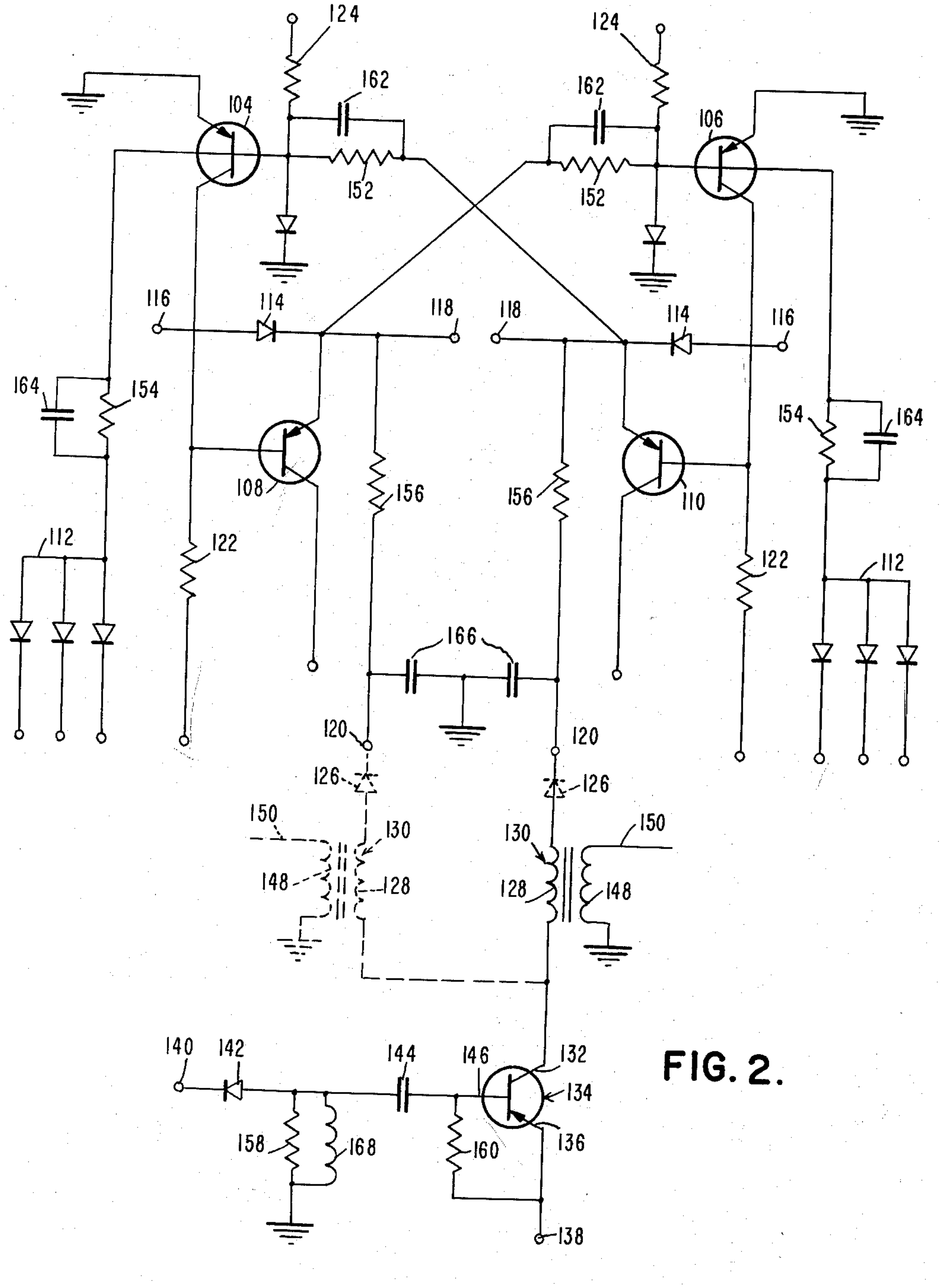
FIG. 2 is a schematic diagram of a second embodiment of the logic component.

A second embodiment of the basic component is illustrated in FIG. 2. In this circuitry a single output of a flip-flop provides a conditioning level through an associated transformer primary to the collector circuit of a single transistor. In this circuitry all the transistors are of the same type, namely PNP. Each side of the flip-flop includes an inverter transistor 104, 106 connected in common emitter configuration and an output transistor 108, 110 connected in emitted follower configuration. An input signal, coupled through a diode OR circuit 112 and a resistor-capacitor network to the base of the off inverter transistor, turns that transistor on. As the transistor turns on the collector potential rises toward ground and the rising voltage level causes the conducting condition of the associated output transistor to change from saturation to the active region. The rising voltage level is also coupled through a diode 114 and a cross-coupling resistor-capacitor network to the base of the other inverter transistor to turn that stage off. The resultant falling voltage level causes the output transistor associated therewith to become saturated and the voltage transition is coupled back through the associated resistor-capacitor network to the base of the transistor to maintain it in its conducting condition. In this flip-flop circuit there are three sets of output terminals: 116 which is used to deliver OR current, 118 which is used to deliver AND current, and 120 which is used for a pulse dodging function. The collectors of inverter transistors 104, 106 are connected through resistors 122 to −15 volt sources, the bases of those transistors are connected through resistor 124 to +9.5 volt sources and the collectors of output transistors 108, 110 are connected to −9.5 volt sources.

A terminal 120 is connected to primary winding 128 of a pulse transformer 130. The other side of the primary is connected to the collector electrode 132 of transistor 134. The emitter electrode 136 of the transistor is connected to a −1.5 source at terminal 138 and negative pulses, applied at terminal 140, are coupled through diode 142 and capacitor 144 to the base electrode 146 of the transistor. The transistor turns on in response to this input pulse whenever its collector circuit is conditioned by a level applied through the transformer primary. The resultant current flow is from the negative source at terminal 138 through transistor 134 and transformer winding 128 to output transistor 110. Current flow in the primary winding of the pulse transformer induces a voltage in secondary winding 148 to provide a signal on output line 150 indicative of the status of the flip-flop. This basic logic component thus provides a single transistor circuit, responsive to sampling pulses applied at terminal 140, which provides a unique information-conveying output signal. It will be noted that the transistor, when conditioned in its collector circuit, operates in response to a sampling pulse applied to its base and when not conditioned, the sampling pulse causes a few milliamperes current flow across the emitter base diode but only $I_{co}$ (a few microamperes) flows in the collector circuit. It will be obvious that the transistor collector may be also connected to the other flip-flop terminal 120, to different flip-flop stages or to similar conditioning sources for sampling them through additional transformer primary windings as indicated by the dotted lines in FIG. 2. Diodes 126, connected between the output terminals 120 of the flip-flop and the primary windings 128 of the pulse transformers are then necessary to avoid a short circuit connection between the conditioning source potential applied from one terminal and a different potential at the other terminal. Suitable values for the components are as follows:

| | |
|---|---|
| Transistors (all) | Philco MADT. |
| Diodes (all) | Transitron T6G. |
| Transformers (all) | 2.3:1 turns ratio. |

Resistors:

| | |
|---|---|
| 122 | 750 ohms. |
| 124 | 27,000 ohms. |
| 152 | 2700 ohms. |
| 154 | 300 ohms. |
| 156 | 91 ohms. |
| 158 | 510 ohms. |
| 160 | 620 ohms. |

Capacitors:

| | |
|---|---|
| 144 | 150 μμf. |
| 162 | 39 μμf. |
| 164 | 100 μμf. |
| 166 | 330 μμf. |

Inductance:

| | |
|---|---|
| 168 | 22 μh. |

Figure 3:
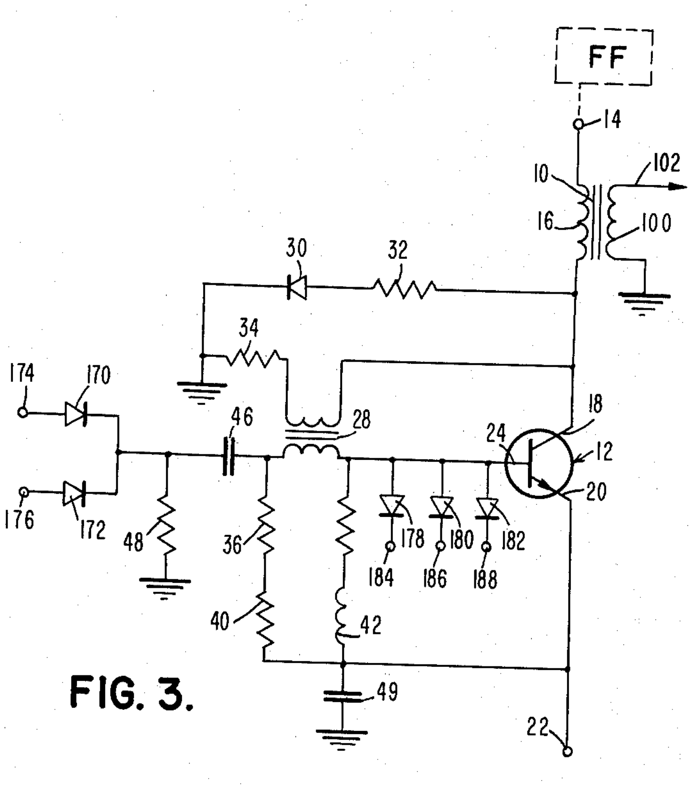
FIG. 3 is a schematic diagram of a circuit arrangement including a basic logic component, the arrangement also being depicted in the block diagram of FIG. 3*a*.
Figure 3A:
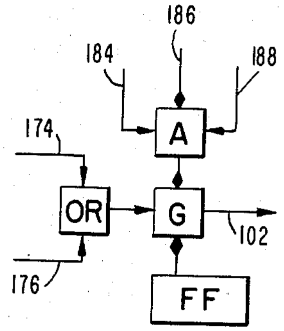

A further measure of the flexibility of this circuitry is shown in the circuit of FIG. 3 in which four conditioning level inputs, and two alternate pulse inputs, are provided. In the associated block diagram, FIG. 3*a*, as in the other block diagrams shown in the drawings a D.C. level signal is indicated by a diamond shaped arrowhead and a pulse signal is indicated by a conventional generally triangularly shaped arrowhead. The basic logic component circuitry of FIG. 3 is the same as that shown in FIG. 1. Hence the corresponding components thereof are assigned the same reference numerals. Connected at the input terminal however are two diodes 170, 172 arranged to provide an OR function. A positive pulse applied to either input terminal 174, 176 will forward-bias the associated diode and be coupled through the capacitor to turn the transistor on if it is appropriately conditioned. Level ANDing circuitry is provided in the base circuit of the transistor 12 by the diodes 178, 180 and 182. The diodes have their anodes connected to the base electrode 24 and a voltage level, either ground or −12 volts is applied to the associated terminals 184, 186, 188 respectively. The diodes function to hold the base electrode 24 at a voltage sufficiently negative to prevent turn on of the transistor 12 in response to a positive pulse applied at one of the input terminals 174, 176 unless all three AND terminals 184, 186 and 188 are at ground. If all terminals of the AND circuit are at ground and the collector circuit is suitably conditioned by a D.C. level a pulse applied at an input terminal will be coupled by the capacitor 46 to the base 24 so that the base-emitter junction of the transistor becomes forward-biased and permits current flow through the primary winding of transformer which induces a voltage in the secondary winding of the transformer to supply a signal on output line 102. If any one of the AND circuit terminals is not at ground or if the collector conditioning level is not present no output pulse will be produced in response to an input pulse. Thus it will be seen that the basic logic component is susceptible to various modifications to provide, in a compact unit employing only a single transistor or similar gain producing element, complex logical functions.

Figure 4:
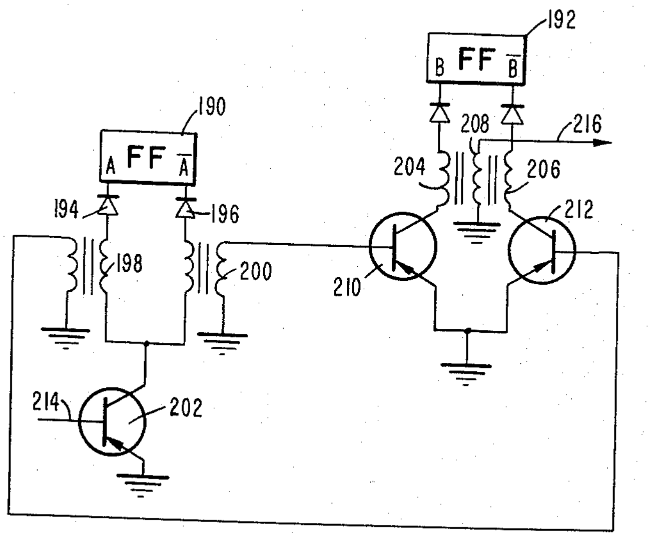
FIG. 4 is a schematic diagram of a second circuit arrangement including a basic logic component, the arrangement also being illustrated in the block diagram of FIG. 4*a*.
Figure 4A:
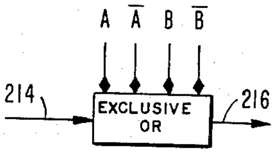

Another circuit arrangement is shown in FIG. 4 in which basic logic components are utilized to provide the exclusive OR function. This arrangement permits a signal on the output terminal only if the value A is present and the value B is not present or if the value B is present and the value A is not present. Flip-flops 190 and 192 provide on their output lines signals indicative of the presence or absence of the values A and B respectively. The outputs of flip-flop 190 are connected through diodes 194 and 196 to the primary windings of transformers 198 and 200 which are connected to the collector circuit of transistor 202. The outputs of flip-flop 192 are connected through diodes to the primary windings 204, 206 of a pulse transformer which has a single output winding 208. The primary winding 204 is also connected to the collector circuit of transistor 210 and primary winding 206 is also connected to the collector circuit of transistor 212. The operation of the circuit is initiated by applying a sampling pulse to the base of transistor 202 on line 214. Assuming the value A is present the sampling pulse will cause current flow through the primary of transformer 198 and induce a signal on its output line which is applied to the base of transistor 212. The collector of that transistor will be conditioned only if the value B is not present and if that condition exists current will flow in the circuit of primary winding 206, inducing a signal on the output line 216. Under the opposite condition (the value A not present) the transistor 202 is conditioned through the primary of transformer 200 and a pulse signal is provided on its output line to the base of transistor 210. In this situation that transistor conducts only if the value B is present and if so current flows in the winding 204 and induces a voltage in the common secondary winding 208 to provide a signal on line 216. Thus the basic logic components may easily be arranged to provide an exclusive OR function.

Figure 5:
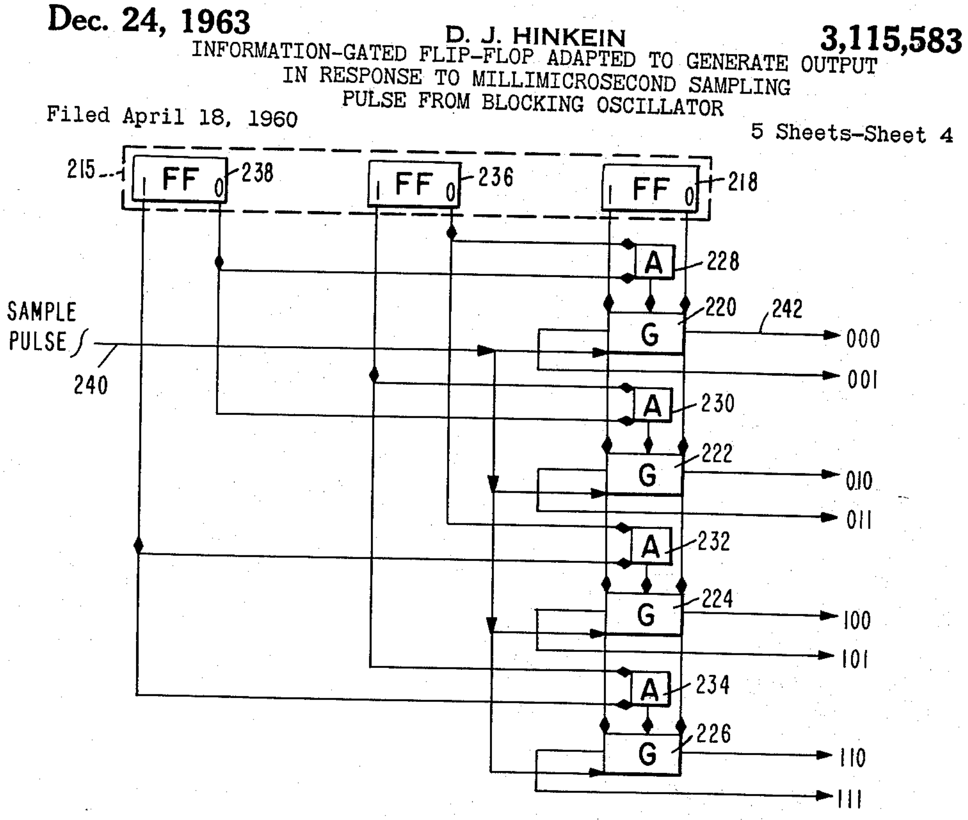
FIG. 5 is a logical block diagram of a decoder using logic components in accordance with the invention.

In FIG. 5 there is shown a three bit register 215 and an AND type decoder which employs logic circuitry of the type shown in FIG. 3. Each "gate" circuit shown in FIG. 5 includes the general type of logic component of FIG. 1 with a single transistor and two pulse transformers, the primary winding of each transformer being connected to one output of flip-flop 218 and to the collector of the single gating transistor. Two input level ANDing is associated with the base circuit of the transistor. Four gate circuits 220, 222, 224, 226 are conditioned by flip-flop 218. The associated "AND" circuits 228, 230, 232, and 234 are conditioned by output levels from the other flip-flops 236 and 238 of the register. A sampling pulse (line 240) is applied to the base circuits of all the gate transistors simultaneously. Each output line of the decoder is associated with a transformer secondary winding. Thus the output of the least (or most) significant flip-flop 218 conditions the collector circuits of each of the four gate transistors. The other two flip-flops include emitter follower output stages and supply conditioning levels from ground to −12 volts to the AND circuitries. A sampling pulse applied on line 240 is coupled by the conditioned transformer and transistor combination and the resultant unique output indicates the decoded value of the quantity stored in the flip-flop register 215. For example, when all three flip-flops are cleared the ZERO outputs are at ground and the ONE outputs of flip-flops 236 and 238 are at −12 volts while the ONE output of flip-flop 218 is at −9.5 volts. Both inputs to AND circuit 228 are at ground while at least one of the inputs of AND circuits 230, 232 and 234 is at −12 volts. Thus only the base of the transistor in "gate" 220 will respond to a pulse on line 240 to turn the transistor on. As the ZERO side of the flip-flop 218 is at ground current will flow through the transformer primary winding associated with that output, generating an output pulse on line 242 indicative of the decoded value of the word stored in register 215. In comparison with the conventional whiffle tree decoder arrangement employing the basic logic components of the invention this decoder requires approximately one half the number of transistors and resolves $n$ times faster ($n$ being the number of stages in the decoder). A limitation on the number of bits that can be decoded with this configuration is the maximum AND circuit conditioning current that can be drawn from the flip-flop. When the circuitry of FIG. 1 is employed this decoder configuration is limited to five bits, due to circuit margin requirements. However, this limitation can be easily overcome by employing level drivers.

Figure 6:
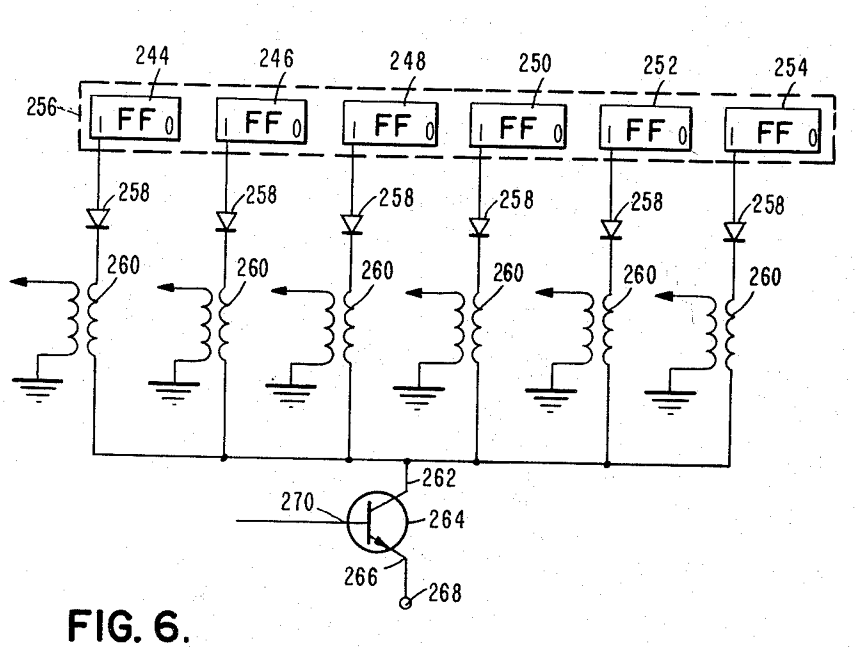
FIG. 6 is a logical block diagram of a register gate arranged by utilizing logic components in accordance with the invention.
Figure 7:
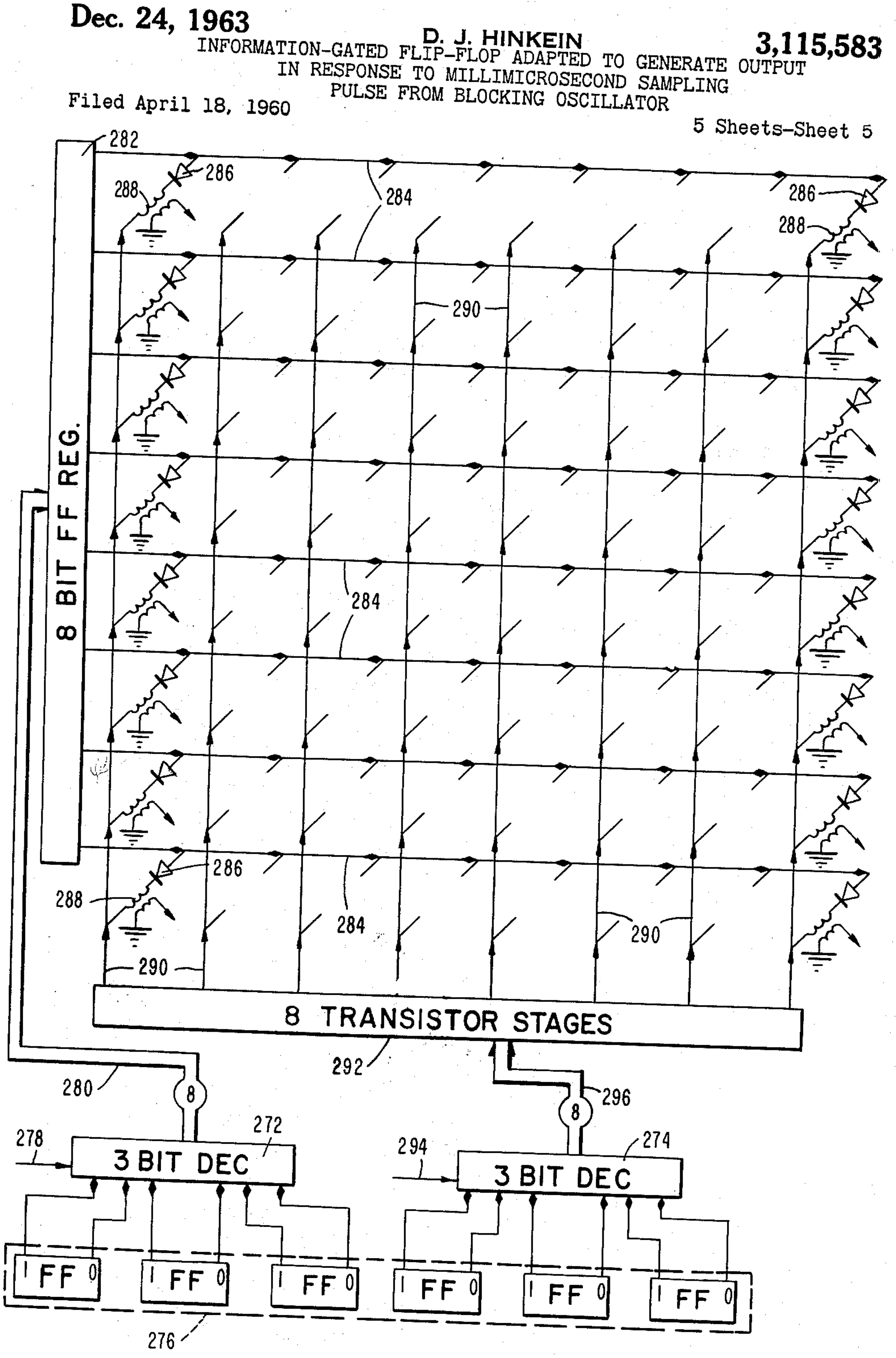
FIG. 7 is a logical block diagram of a decoder matrix utilizing logic components in accordance with the invention.

Still another configuration of basic logic components is illustrated in FIG. 6 in which a plurality of flip flops 244–254 in a flip-flop register 256 are connected via associated diodes 258 and transformer primary windings 260 to the collector electrode 262 of a transistor 264. The emitter electrode 266 is connected to a negative voltage source at terminal 268 and pulses are applied to the base electrode 270. When a pulse is applied to the base electrode 270 the transistor turns on if its collector electrode 262 is conditioned and current flows through each of the transformer primaries that are supplying a conditioning level. As a result of the current flow output signals are generated on the associated lines indicative of the status of the flip-flops. With this arrangement a pulse transformer for each flip-flop and a single transistor are employed as a register sampling device. A limit on the number of sources that can be simultaneously gated lies in the driving capabilities of the transistor but even with this limit a substantial reduction in the number of components required for many logic functions is achieved with this arrangement. If it is desirable to provide a uniform load on the transistor 264 both the ZERO and the ONE output levels may be applied through transformers to the collector. In this manner an equal number of levels are applied to the transistor for any condition of the register 256.

Where it is desired to decode longer words a matrix arrangement of logic components is advantageously employed. Illustrated in FIG. 7 is a six bit decoder in which decoding is accomplished in a two step process. The first stage employs two AND type decoders 272, 274 (of the type shown in FIG. 5) and a group of three bits as supplied from the flip-flops of register 276 is decoded in each. Decoder 272 is sampled first (line 278) and the output signal is applied over one of the lines in cable 280 to set a flip-flop in register 282. The resultant output level from register 282 is applied over a (horizontally illustrated) conductor 284 to a group of transformer windings in the matrix 284. (Only representative ONES from the transformers have been shown and it will be understood that there are sixty-four transformers in the illustrated matrix.) As indicated in FIG. 7 each horizontal conductor 284 is connected through diodes 286 to transformer primary windings 288. The conditioning level supplied from register 282 thus is applied to all the vertically disposed conductors 290 of the matrix. Each vertical conductor is connected to the collector electrode of a transistor (generally indicated as transistor stages in block 292). (The circuit connection between each transformer primary and collector electrode is indicated by a conventional triangularly shaped arrowhead for convenience and clarity of illustration although when the circuitry of FIG. 1 is employed pulse current flows in the opposite direction.) The second group of three bits are decoded as a result of a pulse applied on line 294 to decoder 274 and a pulse signal is applied over one of lines 296 to the base electrode of one of the transistors 292. A pulse of current then flows through the single winding 288 that is connected to the collector of the conducting transistor and that is conditioned by a level from the conditioning source 282. Thus only one of the transformer windings in the matrix has an output and that output indicates the decoded value of the contents of the six bit register 276. While the matrix has been disclosed as employing sixty-four pulse transformers arranged in an 8 x 8 configuration it will be understood that this decoding arrangement may be employed in a variety of other configurations.

The logic components of the invention thus provide improved, reliable high speed digital computer circuitries. Preferred embodiments of the basic logic components of the invention have been operated in computer evaluation circuitries at pulse repetition frequencies of 6.25 megacycles. The invention provides a reliable and versatile component capable of being utilized in a wide variety of digital computer logic applications and enables substantially greater packaging density than that available with components of the prior art. While preferred embodiments of the invention have been shown and described it will be understood that the invention is not intended to be limited thereto or to details thereof and departures may be made therefrom within the spirit and scope of the invention as defined in the claims.

I claim:

1. A rapidly responsive logic component for use in high speed electronic digital computers operating in the binary mode, said component being adapted to generate output signals as a function of millimicrosecond pulse signals of substantially constant time duration and information-conveying level signals of variable time duration at least two times greater than the duration of said pulse signals comprising a transistor having emitter, base and collector electrodes, said transistor being arranged to produce an amplified signal at said collector electrode in response to a pulse signal applied to said base electrode, said amplified signal being inverted in phase with respect to said pulse signal, a pulse transformer having a primary winding and a secondary winding inductively coupled together, each of said windings having two terminals, one terminal of said primary winding being connected to said collector electrode, a low impedance source connected to apply said information conveying level signal of variable time duration directly to the other terminal of said primary winding to condition said transistor via said collector electrode for conduction in response to a pulse applied to said base electrode, an output line connected to one terminal of said secondary winding, and means to apply said millimicrosecond pulse to said base electrode, said source supplying current through said primary winding to said element only during the duration of the pulse signal and only when said level signal is being applied to said other terminal by said source at the time that said pulse signal is applied to said base electrode so as to induce a voltage in said secondary winding and apply a signal on said output line.

2. The logic component as claimed in claim 1 wherein said low impedance source includes a second transistor adapted to be placed in a saturated state of conduction when said source is supplying said information conveying conditioning level so that hole storage effects in said second transistor supply current to said first transistor when said millimicrosecond pulse is applied thereto.

3. The logic component as claimed in claim 1 wherein said low impedance source includes a second transistor having an input circuit and an output circuit responsive to current flow in said input circuit, means to maintain said second transistor in either a first or a second stable state of conduction, means to change said second transistor from a first to a second stable state of conduction comprising means to apply a pulse to said input circuit of said second transistor including clamping means adapted to maintain said input circuit at ground potential to inhibit the leading edge of said pulse from affecting the conducting state of said second transistor but to permit the trailing edge of the pulse transition to produce a change of conductive state of said second transistor, said conditioning level being applied from the output circuit of said second transistor when it is in one of said stable states of conduction.

4. A logic component for use in electronic digital computers operating in the binary mode, said component being adapted to generate an output signal that is a function of an information conveying level and an information conveying pulse comprising a first transistor having base, emitter and collector electrodes, said transistor having its emitter electrode connected to a reference potential and being arranged to produce an amplified signal at said collector electrode in response to a pulse signal applied to said base electrode, an output impedance element having first and second terminals, one of said terminals being connected to said collector electrode, a low impedance source including a semi-conductor element adapted to apply said information conveying level to the other terminal of said output impedance element when said semi-conductor element is in a saturated condition to condition the transistor through said collector electrode, and means to apply an information conveying pulse to said base electrode, said component being adapted to apply said amplified signal to said output impedance element only when said level is being applied to said other terminal at the same time that said information conveying pulse is applied to said base electrode.

5. The logic component as claimed in claim 4 wherein said semi-conductor element is a second transistor having an input circuit and an output circuit responsive to current flow in said input circuit, and said low impedance source further includes means to maintain said second transistor in either a first or a second state of conduction, means to change said second transistor from a first to a second stable state of conduction comprising means to apply a pulse to said input circuit of said second transistor including clamping means adapted to maintain said input circuit at ground potential to inhibit the leading edge of said pulse from affecting the conducting state of said second transistor but to permit the trailing edge of the pulse transition to produce a change of conductive state of said second transistor, said conditioning level being applied from the output circuit of said second transistor when it is in the more staturated of said two states of conduction and being arranged so that current flows through said output circuit only when said conditioning level is being applied at the same time that said pulse is applied to the base electrode of said first transistor.

6. A logic component for use in electronic digital computers, said component being adapted to generate an output signal as a function of an information conveying level and a pulse and comprising a first transistor having emitter, base and collector electrodes, a pulse transformer having a primary winding and a secondary winding inductively coupled together, each of said windings having two terminals, one terminal of said primary winding being connected to the collector electrode of said first transistor, means to apply an information conveying D.C. conditioning level to the other terminal of said primary winding including a second transistor having an input circuit and an output circuit, means to maintain said second transistor in either a saturated or a nonsaturated, state of conduction, said second transistor being adapted to apply a conditioning level through said primary winding to said collector electrode when in said saturated state of conduction, means to change the state of conduction of said second transistor from one state to another by applying a signal to its input circuit, an output line connected to one terminal of said secondary winding, and means to apply an information conveying pulse to the base electrode of said first transistor, said component being adapted to apply a signal on said output line only when said D.C. conditioning level is being applied to said collector electrode at the same time that said information conveying pulse is applied to said base electrode.

7. A logic component for use in electronic digital computers comprising a transistor having emitter, base and collector electrodes, said transistor having its emitter electrode connected to a reference potential and being arranged to produce an amplified signal at said collector electrode in response to a pulse signal applied to said base electrode, a plurality of transformer primary windings connected to said collector electrode, an asymmetrically conductive device connected in series with each transformer winding, each device being poled to permit current flow from the associated transformer winding in the same direction relative to said collector electrode, means to selectively apply information conveying conditioning levels through said transformer windings to said collector electrode including a semi-conductor element associated with each transformer winding, each said semi-conductor element being arranged to apply a conditioning level through the associated transformer primary winding to said collector electrode when in saturated condition, output means inductively coupled to said transformer windings, and means to apply a pulse to the base electrode of said transistor, said component being adapted to apply signals on said output means only when said conditioning level is being applied to an associated transformer winding at the same time that said pulse is applied to said base electrode.

8. The component as claimed in claim 7 wherein said information conveying levels are supplied from the two output terminals of a bistable multivibrator and each said terminal is respectively connected directly through an asymmetrically conductive device to one of said transformer primary windings.

9. A logical component for use in electronic digital computers operating in the binary mode comprising a register having N bistable devices adapted to store signals representative of a number in binary form, each bistable device adapted to provide two output levels indicative of the state of the device, $2^{N-1}$ gate devices associated with one of said bistable devices, each gate device adapted to be conditioned by either level from said one bistable device, the output levels of the other bistable devices being selectively connected to each said gating device as conditioning levels and means to apply a sampling pulse simultaneously to said gating devices such that one of said devices produces an output signal indicative of the decoded value of the number stored in said register.

10. A logic component for use in electronic digital computers operating in the binary mode comprising a register comprising N flip-flops adapted to store signals representative of a number in binary form, each flip-flop having two outputs, $2^{N-1}$ gates associated with one of said flip-flops, each gate including a transistor having emitter, base and collector electrodes, said transistor being connected in common emitter configuration, and two pulse transformers, each having primary and secondary windings, one terminal of each primary winding being connected to an associated output of the flip-flop and the other terminal of each primary winding being connected to the collector electrode of said transistor, an output of each of the other flip-flops being selectively connected in an AND function to the base electrode of a transistor and means to apply a sampling pulse to the base electrodes of said transistors such that current flows in one of said primary windings and produces an output signal in the associated secondary winding indicative of the decoded value of the signals contained in said register.

11. A rapidly responsive logical gate component for use in high speed electronic digital computers, said gate component being adapted to generate an output signal in response to a sampling pulse of millimicrosecond duration when conditioned by a level signal provided by an information storage element, said level signal having a duration substantially greater than the duration of said sampling pulse, comprising a transistor having emitter, base and collector electrodes, said emitter electrode being connected to a reference potential, coupling means connected between an input terminal and said base electrode, a pulse transformer having a primary winding and a secondary winding inductively coupled together, each of said windings having two terminals, one terminal of said primary winding being connected to said collector electrode, and means to apply said level signal directly to the other terminal of said primary winding from said information storage element, and an output line connected to one terminal of said secondary winding, said transistor conducting to apply a current transition to said primary winding in response to a sampling pulse applied to said input terminal only when said level signal from said information storage element is being applied through said primary winding to said collector electrode, said current transition being of a magnitude sufficient to induce a voltage in said secondary winding to produce a signal on said output line of the same polarity as said sampling pulse and indicative of the value stored in said information storage element.

12. The logical gate component as claimed in claim 11 wherein said coupling means includes a capacitor and the secondary winding of a second transformer connected in series between said input terminal and said base electrodes, said second transformer having a primary winding connected to the collector electrode of said transistor, at least one asymmetrically conductive device connected in shunt with said coupling means, and means to apply a level signal from a second information storage element to said asymmetrical conductive device to control the operation of said transistor.

13. The logical component as claimed in claim 9 wherein each said gate device includes a transistor having emitter, base and collector electrodes, said transistor being connected in common emitter configuration, a plurality of diodes connected in parallel to said base electrode to provide an AND function, feedback means connected between said collector electrode and said base electrode, and two pulse transformers, each having a primary winding and a secondary winding and each primary winding being connected to said collector electrode, said logical component being arranged so that each output level from said one bistable device is applied through a corresponding primary winding to said collector electrode of each gate device, the output levels from the other bistable devices are selectively applied to said diodes, and said sampling pulse is applied simultaneously to the base electrode of each gate device transistor.

References Cited in the file of this patent

UNITED STATES PATENTS

| | | |
|---|---|---|
| 2,849,703 | Bindon et al. | Aug. 26, 1958 |
| 3,018,393 | Levy et al. | Jan. 23, 1962 |

FOREIGN PATENTS

| | | |
|---|---|---|
| 762,057 | Great Britain | Nov. 21, 1956 |
| 769,384 | Great Britain | Mar. 6, 1957 |